(12) United States Patent  
Gribkov et al.

(10) Patent No.: US 9,228,835 B2
(45) Date of Patent: Jan. 5, 2016

(54) VISUAL STAKEOUT

(71) Applicant: JAVAD GNSS, Inc., San Jose, CA (US)

(72) Inventors: Mikhail Gribkov, Moscow (RU); Alexander Khvalkov, Moscow (RU)

(73) Assignee: JAVAD GNSS, INC., San Jose, CA (US)

( * ) Notice: Subject to any disclaimer, the term of this patent is extended or adjusted under 35 U.S.C. 154(b) by 185 days.

(21) Appl. No.: 13/626,688

(22) Filed: Sep. 25, 2012

(65) Prior Publication Data

US 2013/0080051 A1 Mar. 28, 2013

Related U.S. Application Data

(60) Provisional application No. 61/539,424, filed on Sep. 26, 2011.

(51) Int. Cl.
*G01C 15/00* (2006.01)
*G01C 21/00* (2006.01)

(52) U.S. Cl.
CPC .............. *G01C 15/00* (2013.01); *G01C 21/005* (2013.01)

(58) Field of Classification Search
CPC ........ G01C 15/00; G01C 25/00; G01C 11/00; G01C 11/02; G01C 15/002; G01C 15/02; G01C 3/04
USPC ......................................................... 701/468
See application file for complete search history.

(56) References Cited

U.S. PATENT DOCUMENTS

| 4,807,158 A | 2/1989 | Blanton et al. |
| 5,471,218 A | 11/1995 | Talbot et al. |
| 5,528,518 A | 6/1996 | Bradshaw et al. |
| 5,596,494 A | 1/1997 | Kuo |
| 5,696,705 A | 12/1997 | Zykan |
| 5,734,337 A | 3/1998 | Kupersmit |
| 5,913,078 A | 6/1999 | Kimura et al. |

(Continued)

FOREIGN PATENT DOCUMENTS

| EP | 1189021 A1 | 3/2002 |
| EP | 1645846 A1 | 4/2006 |

(Continued)

OTHER PUBLICATIONS

Non Final Office Action received for U.S. Appl. No. 12/571,244, mailed on Jul. 20, 2012, 59 pages.

(Continued)

*Primary Examiner* — Fadey Jabr
*Assistant Examiner* — Aaron L Troost
(74) *Attorney, Agent, or Firm* — Morrison & Foerster LLP (57) ABSTRACT

A method for marking a point of interest in a live image on a navigation device is provided. A position of a navigation device is determined based on navigation signals received from satellites. An orientation of the device is determined based on data from an orientation sensor. A first live image is obtained from a first camera and displayed. A first marker is displayed in the first live image. The first marker indicates a first location of the point of interest in the first live image. A second live image is obtained and displayed. A second marker is displayed in the second live image. The second marker indicates a second location of the point of interest in the second live image. The first and second locations are based on the position of the device, the orientation of the device and the position of the point of interest.

24 Claims, 9 Drawing Sheets

(56) References Cited

U.S. PATENT DOCUMENTS

| | | | |
|---|---|---|---|
| 6,083,353 A | 7/2000 | Alexander, Jr. | |
| 6,522,292 B1 | 2/2003 | Ellenby et al. | |
| 6,633,256 B2 | 10/2003 | Zhdanov et al. | |
| 6,735,522 B2 | 5/2004 | Mori | |
| 6,810,293 B1 | 10/2004 | Chou et al. | |
| 6,906,664 B2 | 6/2005 | Tseng et al. | |
| 6,947,820 B2 | 9/2005 | Ohtomo et al. | |
| 7,183,897 B2 | 2/2007 | Tang et al. | |
| 7,184,088 B1 | 2/2007 | Ball | |
| 7,471,249 B2 | 12/2008 | Tang et al. | |
| 7,646,339 B2 | 1/2010 | Green et al. | |
| 7,764,365 B2 | 7/2010 | Nichols et al. | |
| 7,792,330 B1 | 9/2010 | Lowder et al. | |
| 8,089,549 B2 | 1/2012 | Yasuda et al. | |
| 8,125,376 B1 | 2/2012 | Ashjaee et al. | |
| 2002/0054223 A1 | 5/2002 | Spriggs | |
| 2003/0090415 A1 | 5/2003 | Miyasaka et al. | |
| 2003/0128162 A1 | 7/2003 | Ellenby et al. | |
| 2004/0202292 A1 | 10/2004 | Cook | |
| 2004/0234123 A1* | 11/2004 | Shirai et al. | 382/154 |
| 2004/0239558 A1 | 12/2004 | Geier et al. | |
| 2004/0257441 A1 | 12/2004 | Pevear et al. | |
| 2005/0001763 A1 | 1/2005 | Han et al. | |
| 2005/0094741 A1 | 5/2005 | Kuroda | |
| 2006/0100816 A1 | 5/2006 | Prentice et al. | |
| 2006/0114164 A1 | 6/2006 | Iluz et al. | |
| 2006/0221351 A1 | 10/2006 | Yu et al. | |
| 2006/0256007 A1 | 11/2006 | Rosenberg | |
| 2006/0259574 A1 | 11/2006 | Rosenberg | |
| 2006/0279727 A1 | 12/2006 | Nichols et al. | |
| 2007/0018890 A1 | 1/2007 | Kulyukin | |
| 2007/0206175 A1 | 9/2007 | Rai et al. | |
| 2007/0229797 A1 | 10/2007 | Sugimoto | |
| 2007/0288197 A1 | 12/2007 | Martin | |
| 2008/0101656 A1 | 5/2008 | Barnes et al. | |
| 2008/0158044 A1 | 7/2008 | Talbot et al. | |
| 2008/0208454 A1 | 8/2008 | Pesterev et al. | |
| 2009/0030612 A1 | 1/2009 | Hayashi et al. | |
| 2009/0082139 A1 | 3/2009 | Hart | |
| 2009/0098880 A1 | 4/2009 | Lindquist | |
| 2009/0189804 A1 | 7/2009 | Ashjaee et al. | |
| 2009/0222237 A1 | 9/2009 | Otani et al. | |
| 2009/0225166 A1* | 9/2009 | Dronge | 348/155 |
| 2010/0008515 A1 | 1/2010 | Fulton et al. | |
| 2010/0008543 A1 | 1/2010 | Yamada | |
| 2010/0033371 A1 | 2/2010 | Kumagai et al. | |
| 2010/0070162 A1 | 3/2010 | Aihara | |
| 2011/0066375 A1* | 3/2011 | France et al. | 701/213 |
| 2012/0166137 A1* | 6/2012 | Grasser et al. | 702/150 |
| 2012/0188122 A1 | 7/2012 | Ashjaee et al. | |
| 2012/0299936 A1 | 11/2012 | Ashjaee et al. | |
| 2012/0320193 A1* | 12/2012 | Lienhart et al. | 348/135 |
| 2014/0081570 A1 | 3/2014 | Ashjaee et al. | |

FOREIGN PATENT DOCUMENTS

| | | | |
|---|---|---|---|
| EP | 2312330 A1 | 4/2011 | |
| JP | 8-129216 A | 5/1996 | |
| JP | 8-240428 A | 9/1996 | |
| JP | 2001-503134 A | 3/2001 | |
| JP | 2003-214850 A | 7/2003 | |
| JP | 2007-218896 A | 8/2007 | |
| JP | 2008-516250 A | 5/2008 | |
| JP | 2009-94987 A | 4/2009 | |
| JP | 2009-210334 A | 9/2009 | |
| JP | 2010-38822 A | 2/2010 | |
| WO | 98/10246 A1 | 3/1998 | |
| WO | 2006/070047 A1 | 7/2006 | |
| WO | WO 2011/141547 A1 * | 11/2011 | |

OTHER PUBLICATIONS

Non Final Office Action received for U.S. Appl. No. 13/353,220, mailed only Oct. 17, 2012, 10 pages.
Notice of Allowance received for U.S. Appl. No. 12/871,705, mailed on Oct. 20, 2011, 13 pages.
Office Action received for European Patent Application No. 10183800.1, mailed on Dec. 30, 2011, 3 pages.
Office Action received for European Patent Application No. 10183800.1, mailed on Jul. 5, 2012, 4 pages.
Extended European Search Report Received for European Patent Application No. 10183800.1, mailed on Dec. 3, 2010, 6 pages.
Extended European Search Report and Search Opinion received for European Patent Application No. 11179395.6, mailed on Dec. 1, 2011, 8 pages.
Extended European Search Report received for European Patent Application No. 11189979.5, mailed on Feb. 27, 2012, 4 pages.
Non-Final Office Action received for U.S. Appl. No. 14/088,194, mailed on Mar. 5, 2014, 38 pages.
Non-Final Office Action received for U.S. Appl. No. 12/571,244, mailed on Dec. 9, 2013, 68 pages.
Notice of Allowance received for U.S. Appl. No. 13/353,220, mailed on Dec. 13, 2013, 8 pages.
Non-Final Office Action received for U.S. Appl. No. 13/301,669, mailed on Dec. 16, 2013, 43 pages.
Office Action received for Japanese Patent Application No. 2010-220064, mailed on Feb. 27, 2014, 10 pages (6 page of English Translation and 4 pages of Official Copy).
Final Office Action received for U.S. Appl. No. 12/571,244, mailed on Feb. 28, 2013, 60 pages.
Final Office Action received for U.S. Appl. No. 13/353,220, mailed on Apr. 11, 2013, 9 pages.
Non Final Office Action received for U.S. Appl. No. 13/353,220, mailed on Sep. 6, 2013, 11 pages.
Extended European Search Report and Search Opinion received for European Patent Application No. 12186129.8, mailed on Feb. 6, 2013, 6 pages.
Office Action received for European Patent Application No. 11179395.6, mailed on Jan. 7, 2013, 4 pages.
Notice of Allowance received for Japanese Patent Application No. 2010-220064, mailed on Jan. 22, 2015, 3 pages of Official Copy only (See Communication under 37 CFR § 1.98(a) (3)).
Final Office Action received for U.S. Appl. No. 13/301,669, mailed on Oct. 8, 2014, 45 pages.
Non-Final Office Action received for U.S. Appl. No. 12/571,244, mailed on Aug. 28, 2014, 75 pages.
Final Office Action received for U.S. Appl. No. 14/088,194, mailed on Sep. 23, 2014, 45 pages.
Office Action Received for Japanese Patent Application No. 2010-220064, mailed on Sep. 5, 2014, 4 pages (2 pages of English Translation and 2 pages of Official Copy).

* cited by examiner

VISUAL STAKEOUT

CROSS-REFERENCE TO RELATED APPLICATIONS

This application claims the benefit of 35 U.S.C. §119(e) to U.S. Provisional Application Ser. No. 61/539,424 filed on Sep. 26, 2011, the entire contents of which are hereby incorporated by reference.

BACKGROUND

1. Field

This application relates generally to global navigation satellite systems (GNSS), and more specifically to providing visual indicators on a live image on a GNSS device for stakeout of a point of interest.

2. Description of Related Art

Navigation receivers that utilize the signals of the global navigation satellite systems, e.g., GPS and GLONASS enable various positioning tasks with very high accuracy. For example, a GLONASS receiver receives and processes radio signals transmitted by the navigation satellites. The satellite signals are carrier harmonic signals that are modulated by pseudo-random binary codes which, on the receiver side, are used to measure the delay relative to a local reference clock. These delay measurements are used to determine the so-called pseudo-ranges between the receiver and the satellites. The pseudo-ranges are different from the true geometric ranges because the receiver's local clock is different from the satellite onboard clocks. If the number of satellites in sight is greater than or equal to four, then the measured pseudo-ranges can be processed to determine the user's single point location $X=(x, y, z)^T$ (all vectors are represented as columns; the symbol $^T$ denotes matrix/vector transpose), as well as compensate for the receiver clock offset.

Stakeout is an example of a particularly useful GNSS application. During stakeout, a specified location is located and a marker is positioned at the physical location. A GNSS device may allow stakeout to occur with a high degree of positional accuracy, e.g., down to the centimeter level. Stakeout is useful in many applications, including construction, agriculture, and scientific research.

When performing stakeout for a particular point of interest with a GNSS device, a user may use the current location provided by the GNSS device to determine the relative location of the point of interest. The user may then move in what the user believes to be the direction of the point of interest. However, it may not be simple to determine which direction to move in, especially when the point of interest is within 10 s of meters. It may be especially difficult to determine the direction of the point of interest when the GNSS device is within centimeters of the point of interest.

BRIEF SUMMARY

An exemplary technique for marking a point of interest in a live image on a navigation device is provided. A position of a navigation device is determined based on navigation signals received from satellites. An orientation of the device is determined based on data from an orientation sensor of the device. A first live image is obtained from a first camera of the device and displayed on a display of the device. A first marker is displayed in the first live image. The first marker indicates a first location of the point of interest in the first live image. The first location is based on the position of the device, the orientation of the device and the position of the point of interest. A second live image is obtained from a second camera of the device and displayed on a display of the device. A second marker is displayed in the second live image. The second marker indicates a second location of the point of interest in the second live image. The second location is based on the position of the device, the orientation of the device and the position of the point of interest.

Another exemplary technique for marking a point of interest in a live image on a navigation device is provided. A position of a navigation device is determined based on navigation signals received from satellites. An orientation of the device is determined based on data from an orientation sensor of the device. A first live image is obtained from a first camera of the device and displayed on a display of the device. A first marker is displayed in the first live image. The first marker indicates a first location of the point of interest in the first live image. The first location is based on the position of the device, the orientation of the device and the position of the point of interest.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

The techniques described herein may allow a GNSS device to visually assist a user performing a stakeout. By providing visual indications of the location of a point of interest on a live image of a scene containing the point of interest, the techniques described below may increase the speed which a user completes a stakeout. While the techniques described herein have particular relevance to stakeout, it should be understood that the techniques are not limited to stakeout and may be useful in other GNSS applications. The use of stakeout as an example GNSS application should not be construed to be limiting.

Figure 1:
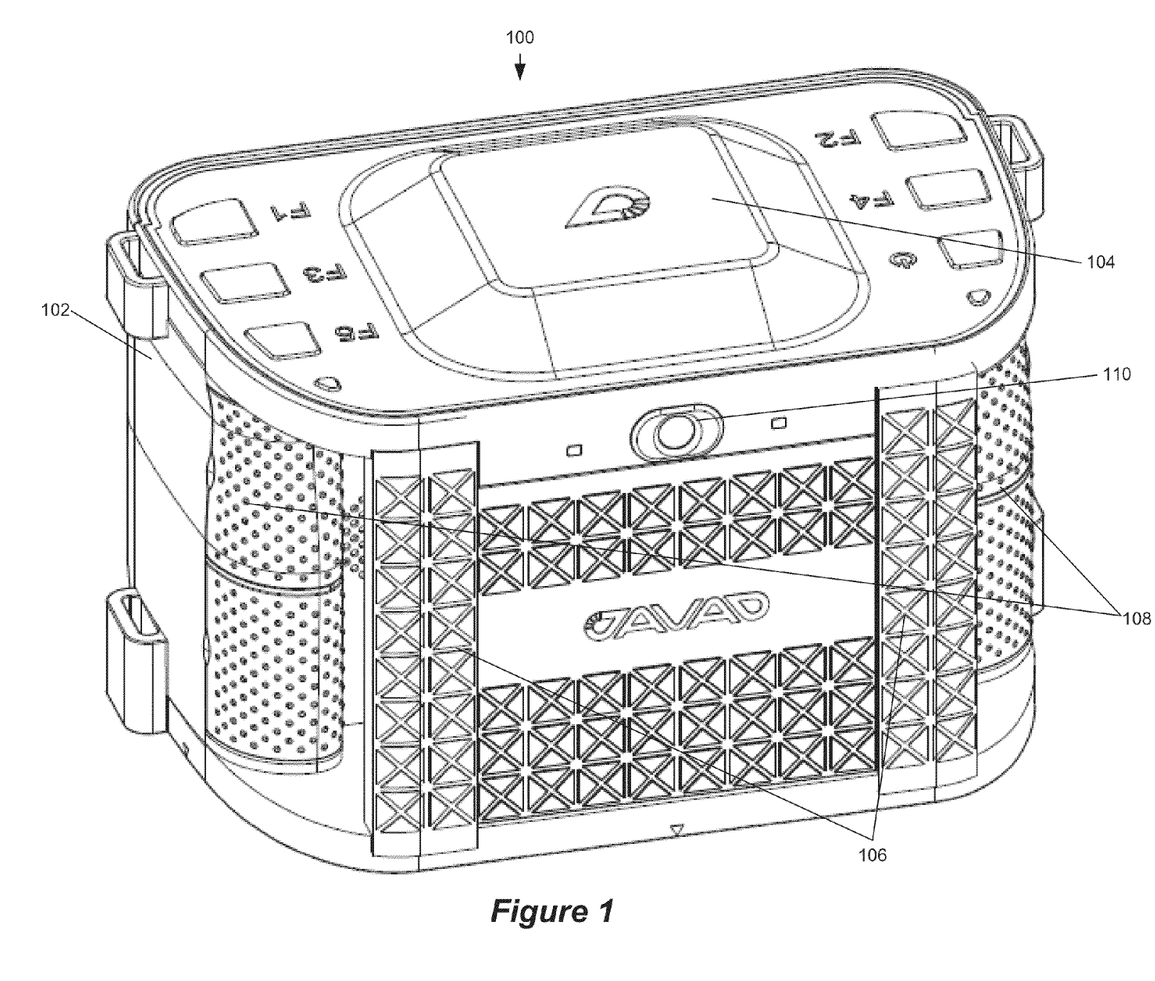
FIG. 1 depicts a perspective view of an exemplary handheld GNSS device.

FIG. 1 illustrates an exemplary handheld GNSS device 100. Handheld GNSS device 100 utilizes a single housing 102. Several GNSS elements are integral to the housing 102 in that they are within the housing or securely mounted thereto. A securely mounted element may be removable. Housing 102 allows the user to hold the handheld GNSS device 100 similar to the way one would hold a typical camera. In one example, the housing 102 may include GNSS antenna cover 104 to cover a GNSS antenna 502 (shown in FIG. 5) which may receive signals transmitted by a plurality of GNSS satellites and used by handheld GNSS device 100 to determine position. The GNSS antenna 502 is integral with the housing 102 in that it resides in the housing 102 under the GNSS antenna cover 104.

In one example, GNSS antenna 502 may receive signals transmitted by at least four GNSS satellites. In the example shown by FIG. 1, GNSS antenna cover 104 is located on the top side of handheld GNSS device 100.

Handheld GNSS device 100 further includes covers for communication antennas 106 integral with the housing 102. In embodiments of the invention there may be three such communication antennas, including GSM, UHF, and WiFi/Bluetooth antennas enclosed beneath covers for the communication antennas 106.

Figure 5:
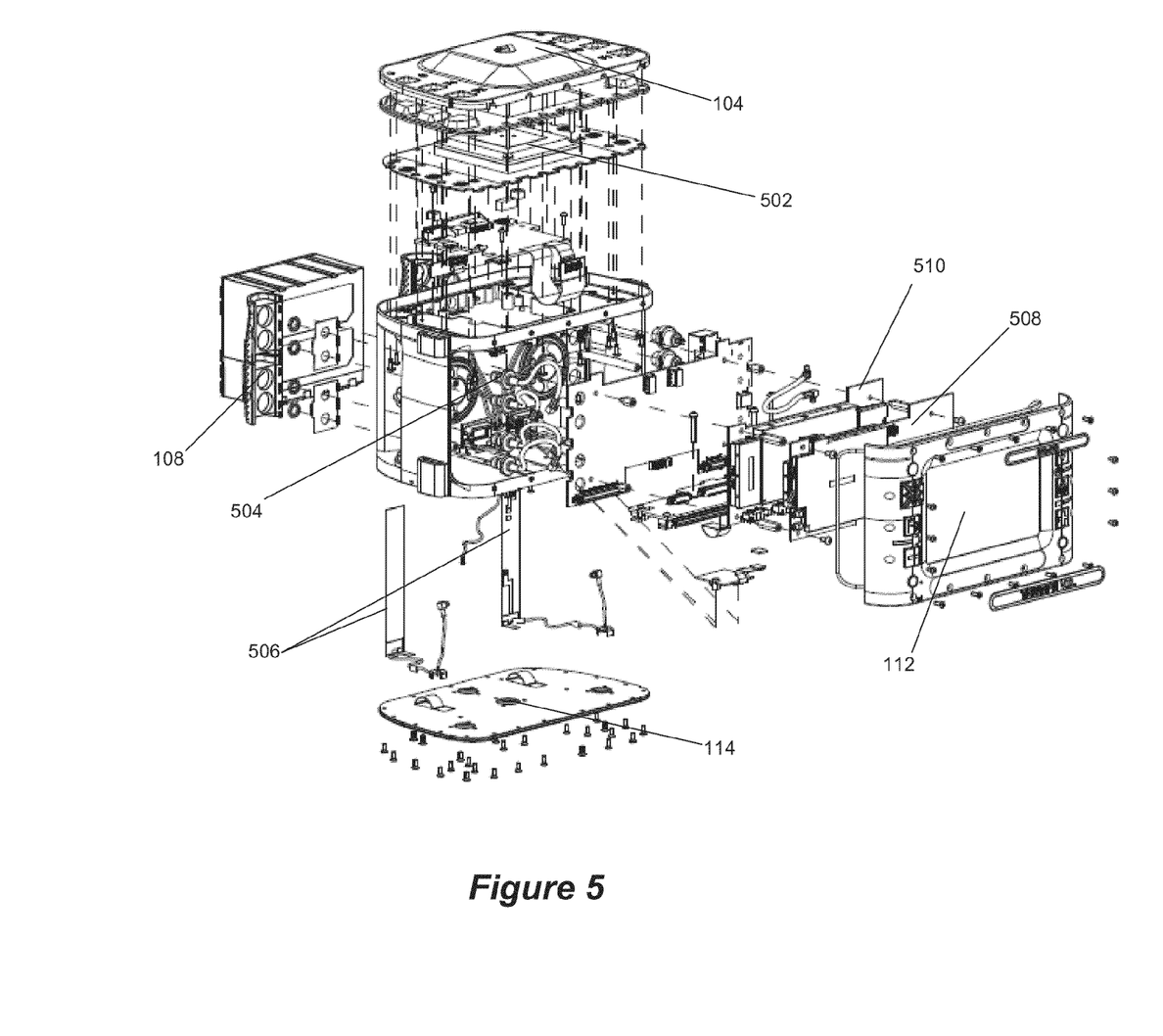
FIG. 5 depicts an exploded view of an exemplary handheld GNSS device.

An exemplary exploded view of handheld GNSS device 100 is shown in FIG. 5. Communication antennas 506 are positioned beneath the covers 106. The GSM and UHF antennas may be only one-way communication antennas. In other words, the GSM and UHF antenna may only be used to receive signals, but not transmit signals. The WiFi antenna may allow two-way communication. The communication antennas 506 receive positioning assistance data, such as differential correction data or raw positioning data from base transceivers.

In the example shown in FIG. 1, the GNSS antenna cover 104 is located on the top of the housing 102. In the same example of FIG. 1, the communication antenna covers 106 are located on the front of the housing 102.

Handheld GNSS device 100 may further include at least one handgrip 108. In the example shown in FIG. 1, two handgrips 108 are integral to the housing 102. The handgrips 108 may be covered with a rubber material for comfort and to reduce slippage of a user's hands.

A front camera 110 is located on the front side of the handheld GNSS device 100. A bottom camera 116 may be located on the bottom side of the handheld GNSS device 100 in the example shown in FIG. 4. The cameras included may be a still or video camera. The front camera 110 and the bottom camera 116 may have the same or different field of views.

The handgrips 108, in certain embodiments, may also be positioned to be near to the communication antenna covers 106. Handgrips 108 are shown in a position, as in FIG. 1, that, when a user is gripping the handgrips 108, the user minimally interferes with the antenna patterns of GNSS antenna 502 and communication antennas 506. For example, the user's hands do not cause more than −40 dB of interference while gripping the handgrips 108 in this configuration, e.g., with the handgrips 108 behind and off to the side of the communication antenna covers 106.

Figure 2:
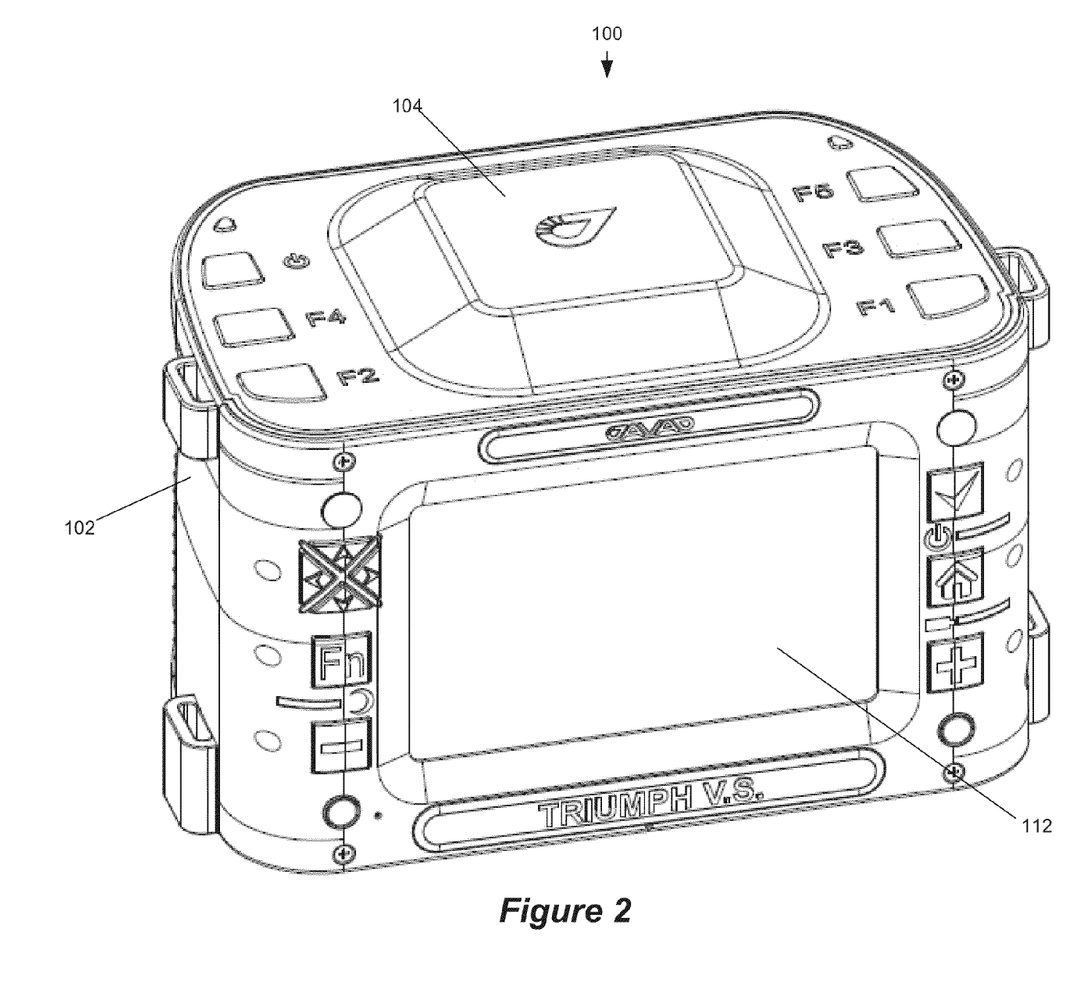
FIG. 2 depicts another perspective view of the exemplary handheld GNSS device.
Figure 3:
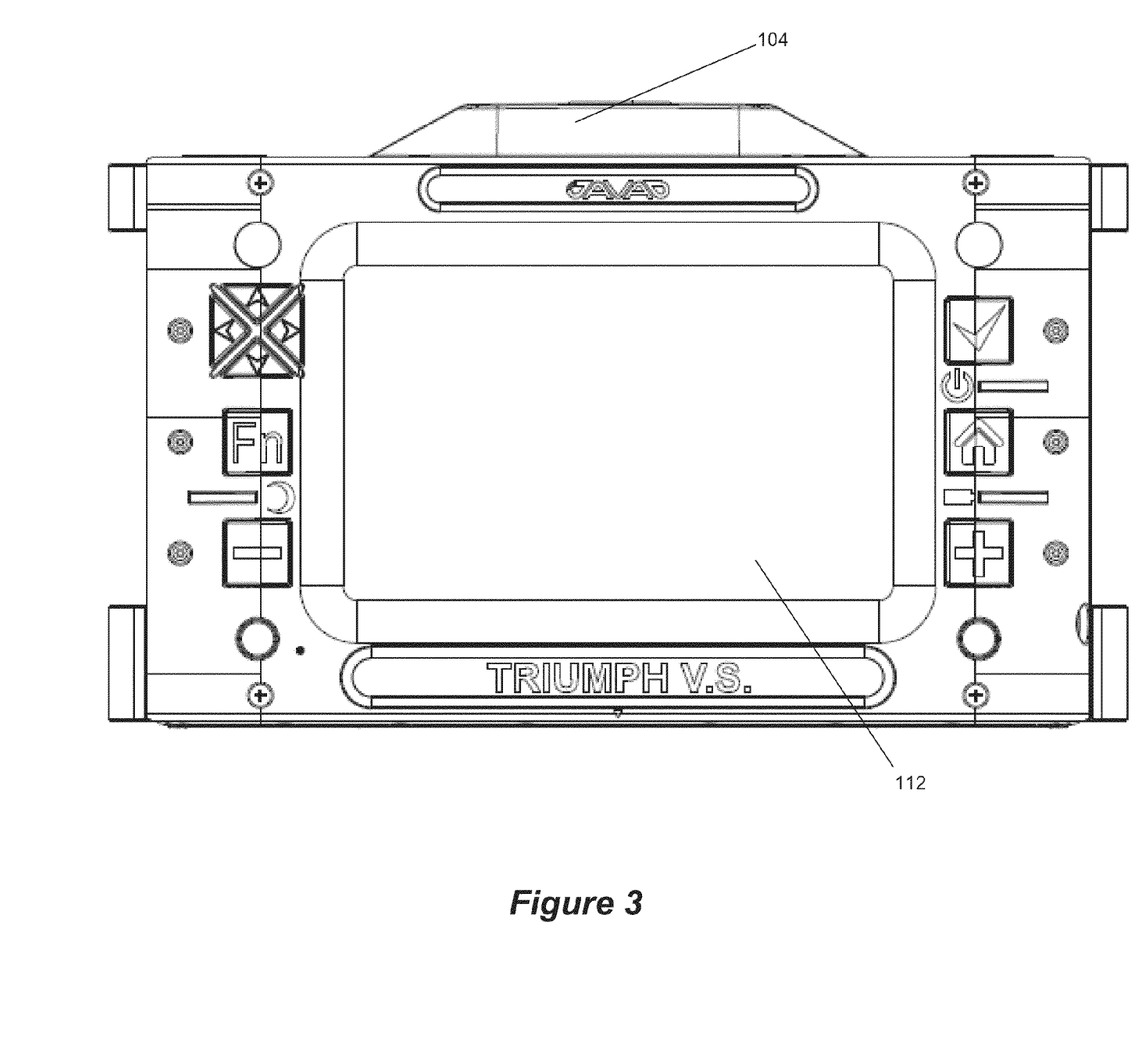
FIG. 3 depicts a back view of the exemplary handheld GNSS device including a display screen for a user.

As shown in FIG. 2 and FIG. 3, handheld GNSS device 100 may further include display 112 for displaying information to assist the user in positioning the device. Display 112 may be any electronic display such as a liquid crystal (LCD) display, light emitting diode (LED) display, and the like. Display 112 may include touch capabilities that allow display 112 to act as an input device. Such display devices are well-known by those of ordinary skill in the art and any such device may be used. In the example shown by FIG. 2, display 112 is integral with the back side of the housing 102 of handheld GNSS device 100.

Handheld GNSS device 100 may further include a camera for recording still images or video. Such recording devices are well-known by those of ordinary skill in the art and any such device may be used. In the example illustrated in FIG. 1, front camera 110 is located on the front side of handheld GNSS device 100. A more detailed description of the positioning of front camera 110 is provided in US Patent Publication No. 2011/0075886, which is incorporated herein by reference in its entirety for all purposes. In one example, display 112 may be used to display the output of front camera 110.

Figure 4:
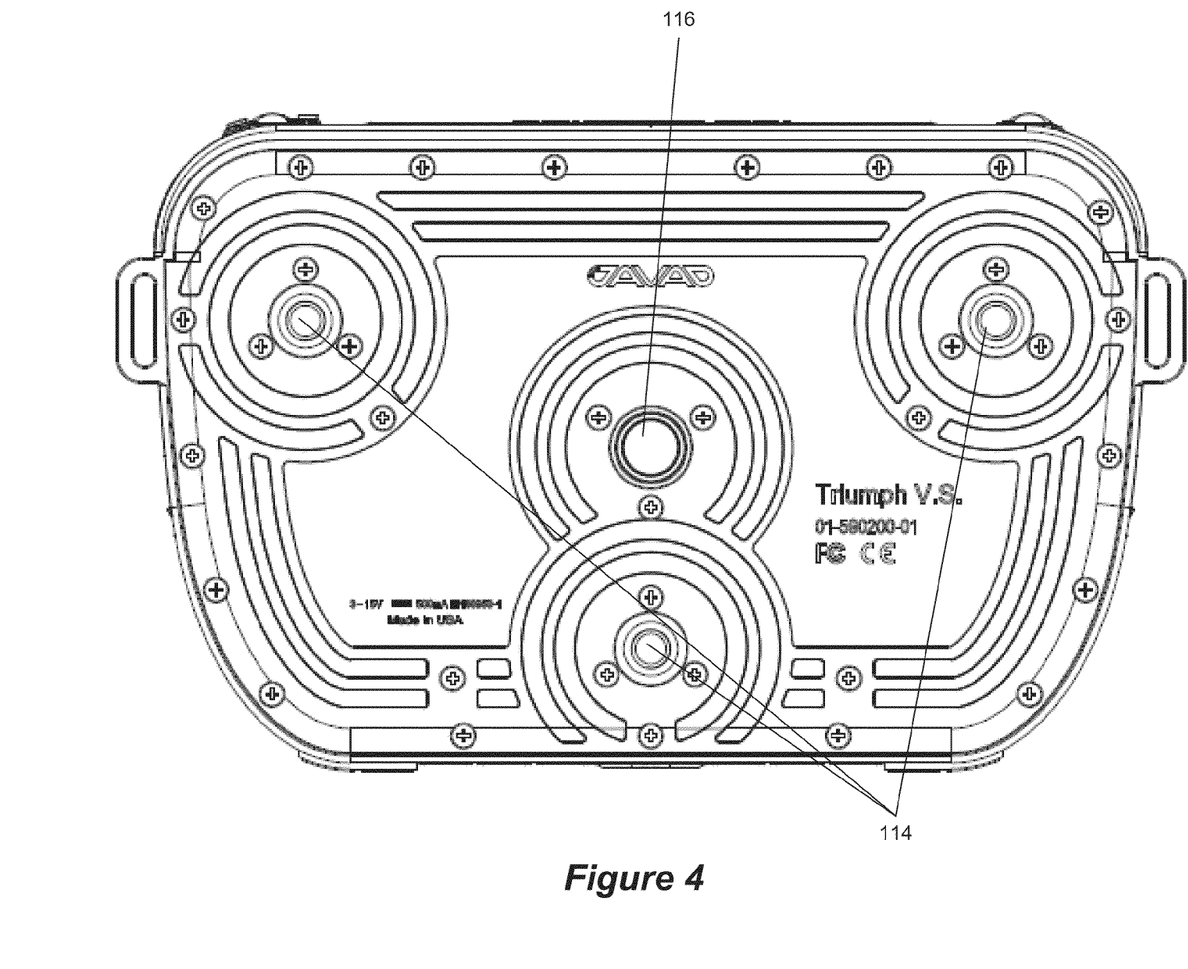
FIG. 4 depicts a bottom view of the exemplary handheld GNSS device.

With reference to FIG. 4, handheld GNSS device 100 may also include a second bottom camera 116 on the bottom of handheld GNSS device 100 for viewing and alignment of the handheld GNSS device 100 with a point of interest marker. The image of the point of interest marker may also be recorded along with the GNSS data to ensure that the GNSS device 808 was mounted correctly, or compensate for mis-alignment later based on the recorded camera information.

Handheld GNSS device 100 may further include orientation sensors (not shown) that may include various types of sensors such as horizon sensors, MEMS gyroscopes, or magnetic compasses for generating orientation data for the device. The orientation data describes the orientation of handheld GNSS device 100 and associated components, such as camera 110, with respect to a ground plane. Orientation data may be recorded by itself or associated with various other data such as GNSS position data or image data.

The horizon sensors may be any type of horizon sensor, such as an inclinometer, accelerometer, and the like. Such horizon sensors are well-known by those of ordinary skill in the art and any such device may be used. In one example, a representation of the output of the horizon sensors may be displayed using display 112. The horizon sensor information, such as pitch and roll, can be recorded along with GNSS data. The horizon sensor information may be useful, for example, to later compensate for mis-leveling of the antenna.

Magnetic compasses are well-know by those of ordinary skill in the art and any such device may be used. Magnetic compasses may determine the heading or bearing of handheld GNSS device 100. Magnetic compass data may be recorded with a captured image. Magnetic compass data may be useful, for example, the direction of image data obtained from the front facing camera.

MEMS gyroscopes are well-know by those of ordinary skill in the art and any such device may be used. The MEMS gyroscopes allow measurement of the angular velocity of handheld GNSS device 100. Based on a starting direction from, for example, a magnetic compass, the MEMS gyroscope information may be used to determine the direction that the front of the device is facing. The MEMS gyroscope information may be recorded with a captured image. The MEMS gyroscope information may be used, for example, to determine the spatial relationship between two images captured by the front facing camera.

While a few types of orientation sensors are discussed above, these examples are not intended to be limiting. Those skilled in the art will understand that other orientation sensors may also me used.

Handheld GNSS device 100 may further include a distance sensor (not shown) to measure a linear distance. The distance sensor may use any range-finding technology, such as sonar, laser, radar, and the like. The distance sensor may be used to determine the distance to objects around GNSS device 100. If mounted on the bottom of GNSS device 100, the distance sensor may also determine the height off the ground of GNSS device 100. Such distance sensors are well-known by those of ordinary skill in the art and any such device may be used.

FIG. 4 illustrates a bottom view of the handheld GNSS device 100 according to embodiments of the invention. The handheld GNSS device 100 may be mounted on a tripod, or some other support structure, by a mounting structure such as three threaded bushes 114, in some embodiments of the invention.

FIG. 5 illustrates an exploded view of the handheld GNSS device 100. When assembled, GNSS antenna 502 is covered by the GNSS antenna cover 104, and the communication antennas 506 are covered by the communication antenna covers 106. Receiver 508 may convert the received GNSS satellite signals from GNSS antenna 502 into Earth-based coordinates, such as WGS84, ECEF, ENU, and the like. GNSS receiver 508 may further send the coordinates to an onboard CPU for processing along with position assistance data received from communication antennas 506 and communication board 510, which are connected together.

Figure 6:
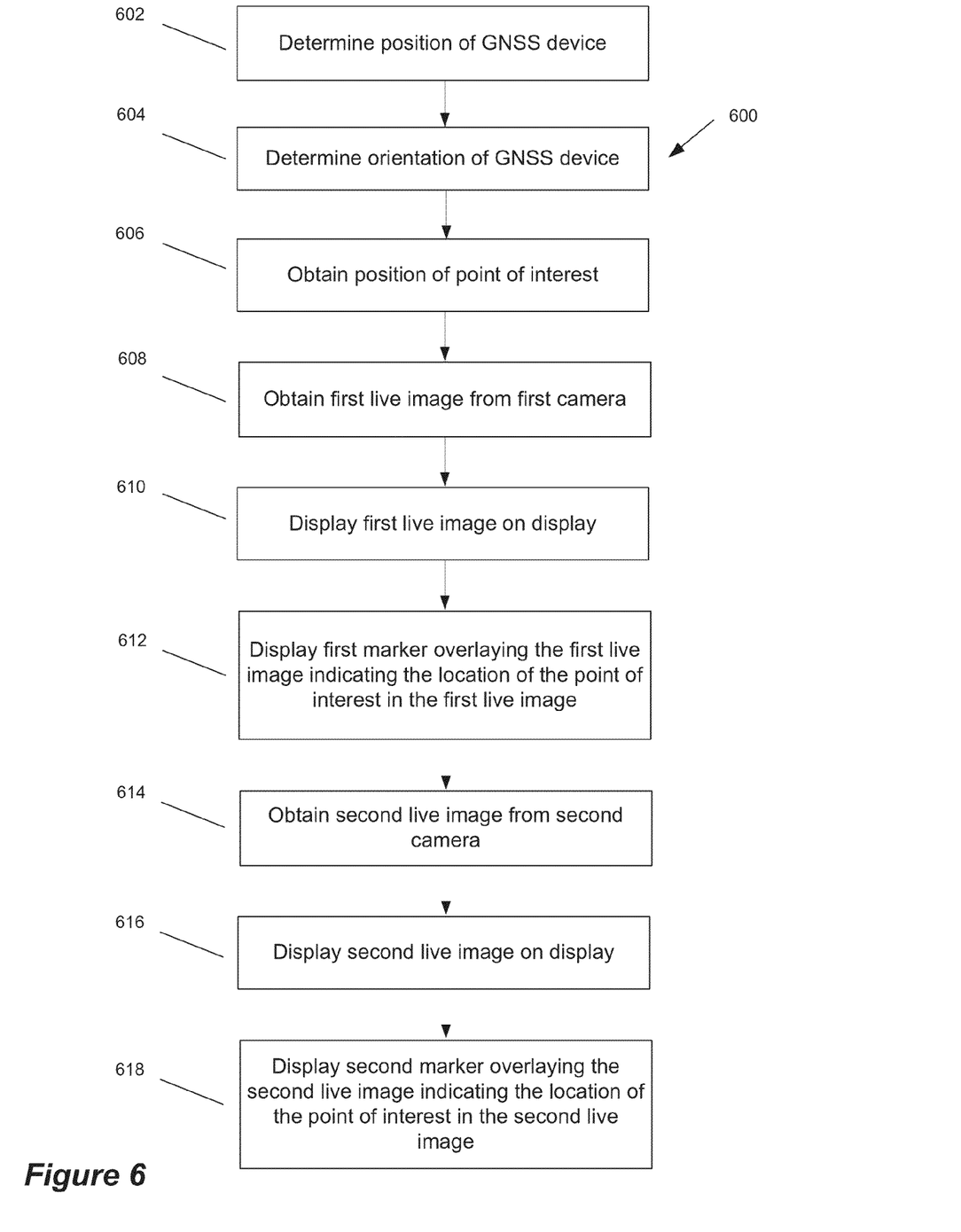
FIG. 6 depicts a flow chart for an exemplary technique for providing visual guidance during stakeout.

FIG. 6 depicts flow chart 600 for an exemplary technique for providing visual guidance during stakeout. The exemplary technique is suitable to be implemented on a GNSS device, such as GNNS device 100 discussed above.

In step 602 of the exemplary technique, the GNSS device determines the position of the GNSS device based on signals received from a plurality of GNSS satellites. In addition to GNSS satellite signals, the position of the GNSS device may also be based on position assistance data received from a base station. The assistance signals may be received by, for example, communication receiver 508 (FIG. 5).

A more detailed description of determining a position based on signals from satellites and base stations is available in U.S. patent application Ser. No. 12/070,333, filed Feb. 15, 2008, published as US Patent Publication No. 2008/0208454 and Ser. No. 12/360,808, filed Jan. 27, 2009, published as US Patent Publication No. 2009/0189804 assigned to the assignee of the present invention, and each of which is incorporated herein by reference in their entirety for all purposes.

In step 604 of the exemplary technique, the GNSS device determines the orientation of the GNSS device based on data from orientation sensors. For example, sensors such as a digital compass, gyroscopes, and accelerometers can provide orientation data such as magnetic direction, pan, tilt, and yaw data. Other sensors may also be used and other orientation data may also be produced.

In step 606 of the exemplary technique, the GNSS device obtains a position of a point of interest. For example, the GNSS device may load the position from memory. Other examples of obtaining the position include, but are not limited to, obtaining the position from a user using an input device such as a keyboard or a touch screen and wirelessly accessing the data using a communication receiver. The position of the point of interest includes data to identify the location of the point of interest. In some cases, the position may be a set of longitude, latitude, and elevation values for the point of interest. In other cases, the elevation data may be omitted or estimated based on the longitude and latitude, near-by elevations, or other estimation methods. In still other cases, the position may be Earth-based coordinates, such as WGS84, ECEF, ENU, and the like.

In step 608 of the exemplary technique, the GNSS device obtains a first live (i.e. real time) image from a first camera.

For example, with reference to GNSS device 100 discussed above, the first live image may be the scene currently present in the field of view of camera 110. It should be understood that a live or real time image does not exclude the possibility of there being a temporal delay in what the image depicts.

In step 610 of the exemplary technique, the GNSS device displays the first live image on a display of the GNSS device. For example, with reference to GNSS device 100 discussed above, the first live image may be displayed on display 112. The display of the GNSS device may be updated with images from the first camera at a particular frame rate, such as 10-30 frames per second, but any frame rate may be used.

In step 612 of the exemplary technique, the GNSS device displays a first marker on the display indicating the location of the point of interest in the first image. The location of the point of interest in the first image may be determined based on data, such as, the position of the point of interest obtained in step 606, the position of the GNSS device determined in step 602, the distance of the point of interest to the GNSS device (determined from the positions from steps 602 and 606), the orientation of the GNSS device determined in step 604, and the field of view of the first camera.

In one example of step 612, the three-dimensional location of the point of interest is known based on the position data from step 606. In cases where the elevation of the point of interest is not known, the elevation may be estimated or the point of interest may be considered to be at all elevations. The extent of the field of view, in three dimensions, in an image obtained from a camera of the GNSS device can be determined based on the angles of the field of view of the camera (i.e., the horizontal and vertical view angles). Then, based on the position of the GNSS device and the orientation of the field of view, which for a front mounted camera is the same as the orientation of the GNSS device, it may be determined whether the three-dimensional location of point of interest is within the three-dimensional extent of the field of view. Additionally, the approximate location of the point of interest in the image may be determined using the same data. It should be understood that the in-image location of the point of interest is approximate but may be very precise. In some cases, the location of the point of interest on the image may be determined absolutely precise because of non-zero pixel dimensions. For example, an approximated location with a precision of 0.1 pixel becomes an exact location with no error.

If the point of interest is not within the field of view of the first image, an indicator, such as an arrow, may be displayed to indicate the direction that the GNSS device needs to be orientated so that the point of interest will be within the field of view of the first image.

Figure 7:
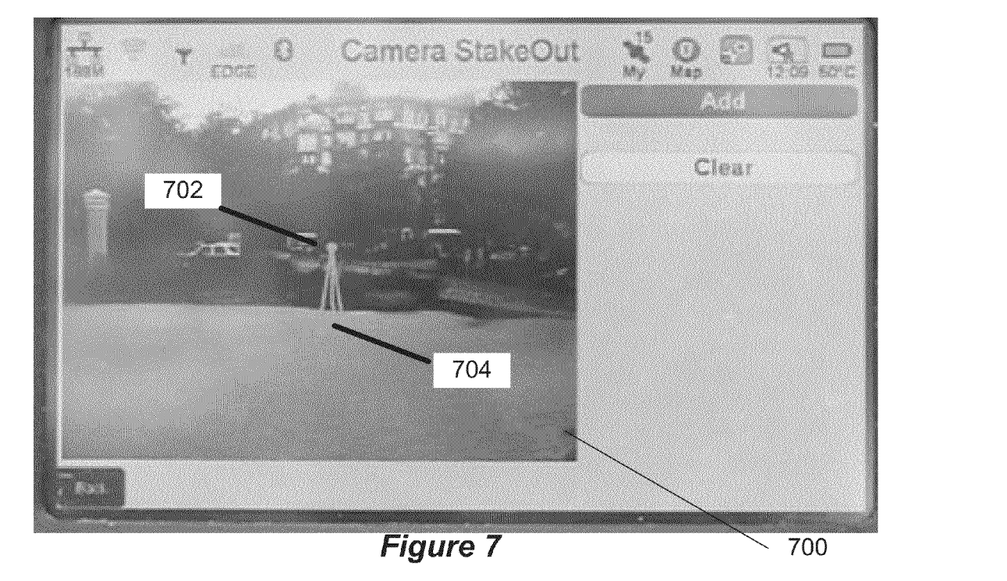
FIG. 7 depicts a screen shot of a GNSS device at a first position and orientation displaying a first marker.
Figure 8:
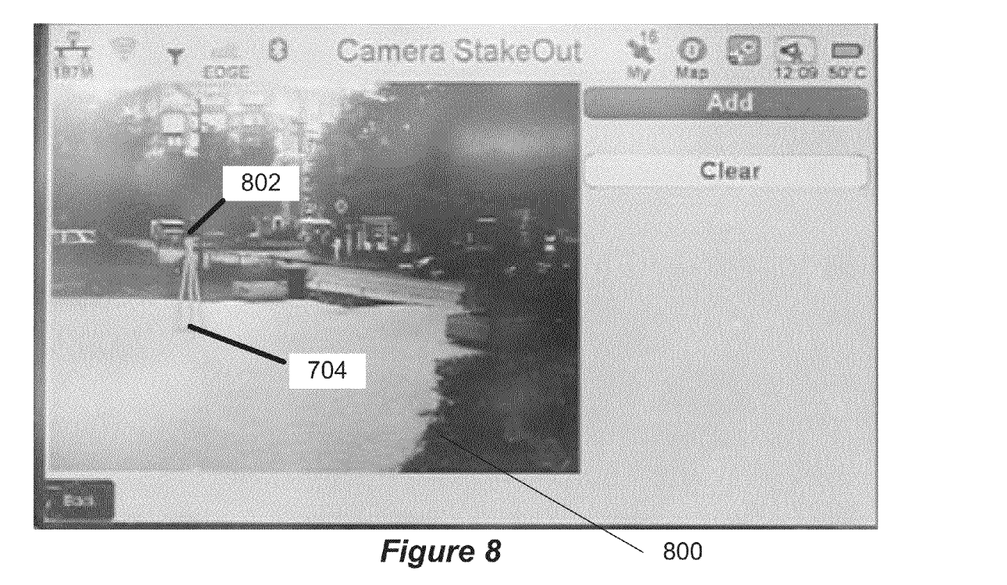
FIG. 8 depicts a screen shot of a GNSS device at a second position and orientation displaying a first marker.
Figure 9:
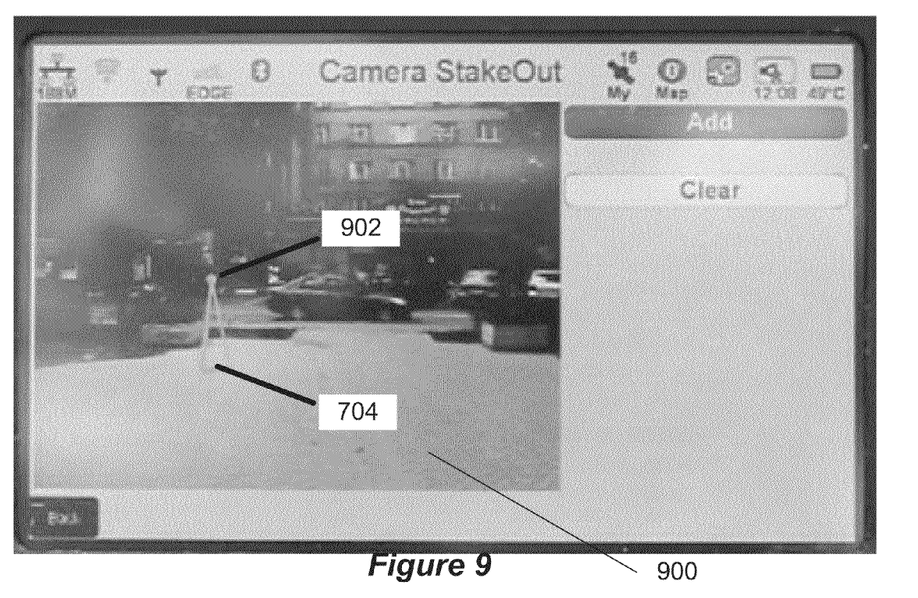
FIG. 9 depicts a screen shot of a GNSS device at a third position and orientation displaying a first marker.

As examples of placing the first marker, FIGS. 7-9 depict first live images 700, 800, and 900 respectively, obtained by a GNSS device in three different positions and orientations. First markers 702, 802, and 902 of FIGS. 7-9, respectively, indicate the location of point of interest 704 in the live images. The series of first live images illustrates how the first marker may be place over the point of interest in the live image regardless of how the GNSS device is positioned and oriented.

Figure 10:
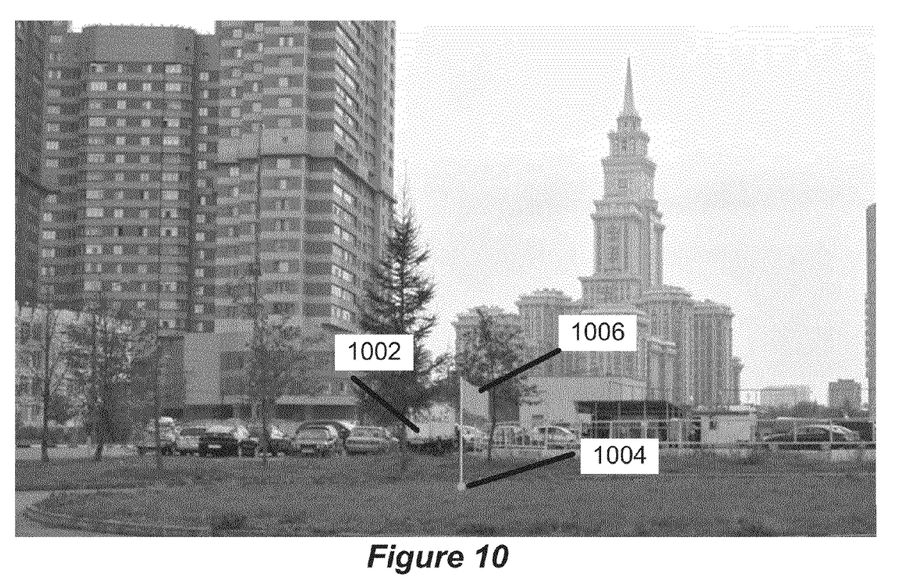
FIG. 10 depicts an exemplary first marker.

The first marker may take any number of forms. FIG. 10 depicts exemplary first marker 1002 that includes fixed portion 1004 and a variable portion 1006. Fixed portion 1004 may be a set size that does not vary depending on the distance from the GNSS device to the point of interest. Variable portion 1006 may be a variable size depending on the distance from the GNSS device to the point of interest. For example, as depicted in FIG. 10, variable portion 1006 may be a flag that is scaled according to the distance from the GNSS device to the point of interest. In other words, the flag will become larger as the GNSS device approaches the point of interest and will become smaller as the GNSS device moves away from the point of interest. When the GNSS device is further from the point of interest than some threshold distance, the flag may be very small (e.g., a single point or small object) or not shown at all.

Exemplary first marker 1002 may change color or some other characteristic to provide an indication of the error associated with the position of the GNSS device. For example, if the position of the GNSS device determined in step 602 is based on a real time kinetic ("RTK") fixed solution, then first marker 1002 or a portion thereof may be a specific color, e.g., the flag is green. Similarly, if the position of the GNSS device determined in step 602 is based on an RTK float solution, then first marker 1002 or a portion thereof may be another specific color, e.g., the flag is yellow. If the GNSS device is in standalone, then first marker 1002 or a portion thereof may be another specific color, e.g., the flag is red. Other color schemes may be used as well.

The first marker may also display other information. For example, the elevation differential between the GNSS device and the point of interest may be displayed or the appearance of the first maker may otherwise depend on the elevation differential. For the example, the height of the first marker may depend on the elevation differential between the GNSS device and the point of interest. The elevation of the point of interest may be known from step 606. The elevation of the GNSS device may be known from step 602.

Alternatively, the elevation differential between the ground below the GNSS device and the point of interest may be displayed or the appearance of the first maker may otherwise depend on the elevation differential. For the example, the height of the first marker may depend on the elevation differential between the GNSS device and the point of interest. The elevation of the ground below the GNSS device may be know based on the position of the GNSS device determined in step 606 and information relating to the height that the GNSS device is off the ground. This height may be obtained from, for example, the user or a distance sensor located on the bottom of the GNSS device.

While the first marker is discussed above with respect to specific examples, the first marker may take other forms as well. For example, the first marker may just be a simple ball or cross. The first marker may also take more complex forms as well. It should be understood that the first marker may be implemented with a wide variety of characteristics without deviating from the present exemplary technique.

In step 614 of the exemplary technique, the GNSS device obtains a second live image from a second camera. For example, with reference to GNSS device 100 discussed above, the second live image may be the scene currently present in the field of view of camera 116. As another example, of step 614, the second live image may also be obtained from the first camera if the optical axis of the first camera has been altered. For example, optics may be used to rotate the field of view of the first camera down 90°.

One example of a GNSS device includes a first and second camera that produce a first and second live image, respectively, that overlap. Another GNSS device may include a first and second camera that produce a first and second live image, respectively, that are distinct and non-overlapping. Various characteristics of the first and second camera, such as field of view and camera orientation, may affect whether the first and second live image are overlapping. Additionally, whether the first and second live images overlap may also depend on how far the scenes in the first and second live images are from the first and second cameras.

GNSS device 100 discussed above has a first camera with an optical axis that is perpendicular to the optical axis of the second camera. Thus, while camera 110 is pointed at the horizon, camera 116 may be pointed at the ground directly below GNSS device 100. Other GNSS devices may have cameras with optical axes substantially perpendicular to each other (e.g., the optical axis of the first camera is within 10° of being perpendicular to the optical axis of the second camera). Still other GNSS devices may have cameras that have optical axes with other orientations with respect to each other, such as having cameras on the left and right sides of the GNSS device.

In step 616 of the exemplary technique, the GNSS device displays the second live image on a display of the GNSS device. In some examples, the second live image may be displayed in place of the first live image. In other examples, the second live image may be displayed concurrently with the first live image. For example, a display of the GNSS device may be divided into two sections for the first and second images. In another example, the GNSS device may have two displays and each display displays either the first or second live image.

In the present exemplary technique, step 616 may be performed in response to the point of interest being within the field of view of the second live image. In another exemplary technique, step 616 may be performed in response to the point of interest leaving the field of view of the first live image. In other exemplary techniques, step 616 may be performed in response to a user command regardless of whether the point of interest is within the field of view of the second live image.

In step 618 of the exemplary technique, the GNSS device displays a second marker overlaying the second live image. The second marker indicates the location of the point of interest in the second live image. The location may be determined using similar procedures as described above with respect to step 612. An exemplary second marker may be a simple cross. However, the form of the second marker may take similar forms as discussed above with respect to the first marker. For example, the second marker may also have a fixed portion and a variable portion as discussed above with respect to the first marker. The second marker may then be used to accurately stakeout the point of interest by aligning a physical marker on the ground with the second marker on the display of the GNSS device.

In another exemplary technique, the same steps of flow chart 600 (FIG. 6) are performed except steps 614, 616, and 618 are omitted. In this technique, only one camera is required.

Figure 11:
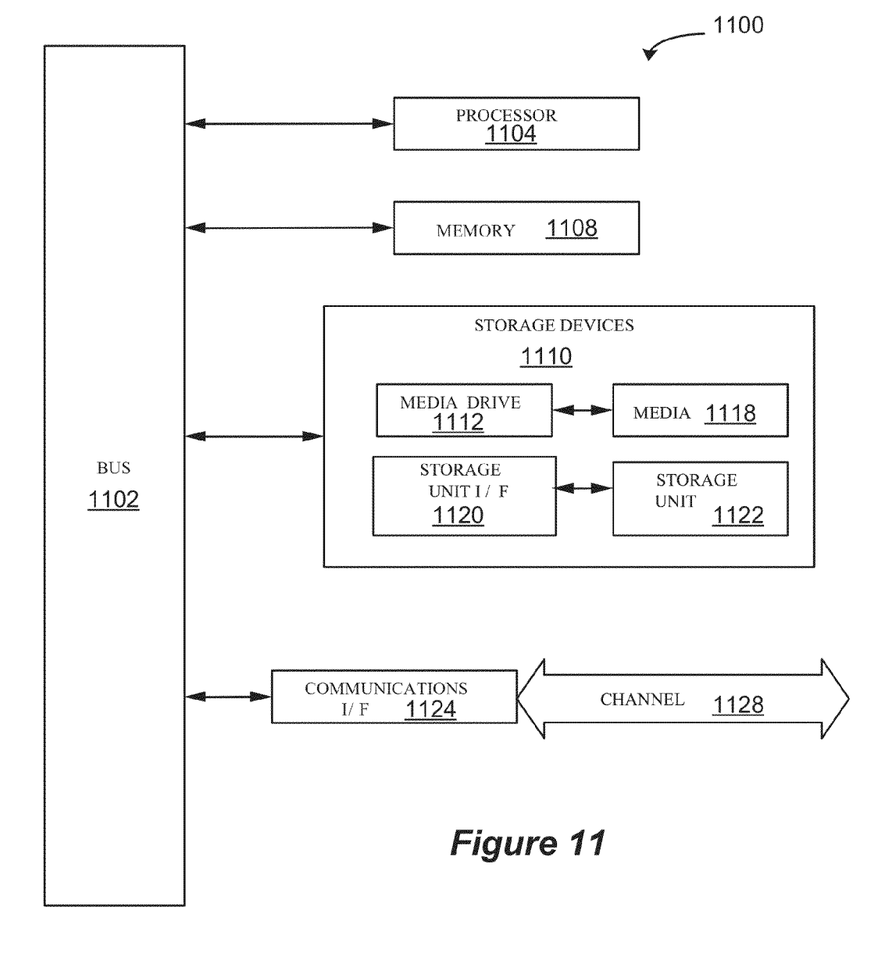
FIG. 11 illustrates a typical computing system that may be employed to implement some or all processing functionality discussed below.

FIG. 11 illustrates a typical computing system 1100 that may be employed to implement processing functionality in embodiments of the invention. Computing systems of this type may be used in clients and servers, for example. Those skilled in the relevant art will also recognize how to implement the invention using other computer systems or architectures. Computing system 1100 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1100 can include one or more processors, such as a processor 1104. Processor 1104 can be implemented using a general or special purpose processing engine such as, for example, a microprocessor, microcontroller or other control logic. In this example, processor 1104 is connected to a bus 1102 or other communication medium.

Computing system 1100 may also include a main memory 1108, such as random access memory (RAM) or other dynamic memory, for storing information and instructions to be executed by processor 1104. Main memory 1108 also may be used for storing temporary variables or other intermediate information during execution of instructions to be executed by processor 1104. Computing system 1100 may likewise include a read only memory ("ROM") or other static storage device coupled to bus 1102 for storing static information and instructions for processor 1104.

The computing system 1100 may also include information storage system 1110, which may include, for example, a media drive 1112 and a removable storage interface 1120. The media drive 1112 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 1118, may include, for example, a hard disk, floppy disk, magnetic tape, optical disk, CD or DVD, or other fixed or removable medium that is read by and written to by media drive 1112. As these examples illustrate, the storage media 1118 may include a computer-readable storage medium having stored therein particular computer software or data.

In alternative embodiments, information storage system 1110 may include other similar components for allowing computer programs or other instructions or data to be loaded into computing system 1100. Such components may include, for example, a removable storage unit 1122 and an interface 1120, such as a program cartridge and cartridge interface, a removable memory (for example, a flash memory or other removable memory module) and memory slot, and other removable storage units 1122 and interfaces 1120 that allow software and data to be transferred from the removable storage unit 1118 to computing system 1100.

Computing system 1100 may also include a communications interface 1124. Communications interface 1124 can be used to allow software and data to be transferred between computing system 1100 and external devices. Examples of communications interface 1124 can include a modem, a network interface (such as an Ethernet or other NIC card), a communications port (such as for example, a USB port), a PCMCIA slot and card, etc. Software and data transferred via communications interface 1124 are in the form of signals which can be electronic, electromagnetic, optical or other signals capable of being received by communications interface 1124. These signals are provided to communications interface 1124 via a channel 1128. This channel 1128 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable storage medium" and the like may be used generally to refer to physical, tangible media such as, for example, memory 1108, storage media 1118, or storage unit 1122. These and other forms of computer-readable storage media may be involved in storing one or more instructions for use by processor 1104, to cause the processor to perform specified operations. Such instructions, generally referred to as "computer program code" (which may be grouped in the form of computer programs or other groupings), when executed, enable the computing system 1100 to perform features or functions of embodiments of the present invention. Note that the code may directly cause the processor to perform specified operations, be compiled to do so, or be combined with other software, hardware, or firmware elements (e.g., libraries for performing standard functions) to do so.

In an embodiment where the elements are implemented using software, the software may be stored in a computer-readable storage medium and loaded into computing system 1100 using, for example, removable storage media 1118, drive 1112, or communications interface 1124. The control logic (in this example, software instructions or computer program code), when executed by the processor 1104, causes the processor 1104 to perform the functions of the invention as described herein.

It will be appreciated that the above description for clarity has described embodiments of the invention with reference to different functional units. However, it will be apparent that any suitable distribution of functionality between different functional units may be used without detracting from the invention. Hence, references to specific functional units are only to be seen as references to suitable means for providing the described functionality rather than indicative of a strict logical or physical structure or organization.

The invention can be implemented in any suitable form including hardware, software, firmware or any combination thereof. Different aspects of the invention may be implemented at least partly as computer software or firmware running on one or more data processors or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the claims. Additionally, although a feature may appear to be described in connection with a particular embodiment, one skilled in the art would recognize that various features of the described embodiments may be combined in accordance with the invention. Moreover, aspects of the invention describe in connection with an embodiment may stand alone as an invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A computer implemented method for marking a point of interest in a live image, the method comprising:
   determining a position of a navigation device based on navigation signals received from satellites;
   determining an orientation of the device based on data from an orientation sensor of the device;

obtaining a position of a point of interest;

obtaining a first live image from a first camera of the device;

displaying the first live image on a display of the device;

displaying a first marker in the first live image indicating a first location of the point of interest in the first live image, wherein the first location is based on the position of the device, the orientation of the device and the position of the point of interest;

determining whether the point of interest is within a field of view of a second camera of the device based on the position of the point of interest;

obtaining a second live image from the second camera of the device; and in response to determining that the position of the point of interest is within the field of view, displaying the second live image on the display of the device and a second marker in the second live image indicating a second location of the point of interest in the second live image, wherein the second location is based on the position of the device, the orientation of the device, and the position of the point of interest.

2. The method of claim 1, wherein the second live image has a second field of view that is substantially perpendicular to a first field of view of the first live image.

3. The method of claim 1, wherein displaying the second live image occurs in response to a user command.

4. The method of claim 1, wherein the first marker includes a fixed portion and a variable portion, wherein the fixed portion has a fixed size independent of a distance from the device to the point of interest, and wherein the variable portion has a size based on the distance from the GNSS device to the point of interest.

5. The method of claim 1, wherein the first marker is a color that depends on an error associated with the position of the device.

6. The method of claim 5, wherein the second marker is a color that depends on an error associated with the position of the device.

7. The method of claim 1, wherein the first marker includes an indication of the difference in elevation between the device and the point of interest.

8. The method of claim 1, wherein the position of the point of interest is obtained from memory in the device.

9. A non-transitory computer-readable medium encoded with executable instructions for marking a point of interest in a live image, the instructions comprising instructions for:

determining a position of a navigation device based on navigation signals received from satellites;

determining an orientation of the device based on data from an orientation sensor of the device;

obtaining a position of a point of interest;

obtaining a first live image from a first camera of the device;

displaying the first live image on a display of the device;

displaying a first marker in the first live image indicating a first location of the point of interest in the first live image, wherein the first location is based on the position of the device, the orientation of the device and the position of the point of interest;

determining whether the point of interest is within a field of view of a second camera of the device based on the position of the point of interest;

obtaining a second live image from a second camera of the device; and in response to determining that the position of the point of interest is within the field of view, displaying the second live image on the display of the device and a second marker in the second live image indicating a second location of the point of interest in the second live image, wherein the second location is based on the position of the device, the orientation of the device, and the position of the point of interest.

10. The computer-readable medium of claim 9, wherein the second live image has a second field of view that is substantially perpendicular to a first field of view of the first live image.

11. The computer-readable medium of claim 9, wherein displaying the second live image occurs in response to a user command.

12. The computer-readable medium of claim 9, wherein the first marker includes a fixed portion and a variable portion, wherein the fixed portion has a fixed size independent of a distance from the device to the point of interest, and wherein the variable portion has a size based on the distance from the GNSS device to the point of interest.

13. The computer-readable medium of claim 9, wherein the first marker is a color that depends on an error associated with the position of the device.

14. The computer-readable medium of claim 13, wherein the second marker is a color that depends on an error associated with the position of the device.

15. The computer-readable medium of claim 9, wherein the first marker includes an indication of the difference in elevation between the device and the point of interest.

16. The computer-readable medium of claim 9, wherein the position of the point of interest is obtained from memory in the device.

17. A navigation device for providing a visual indication of a point of interest on a live image, the device comprising:

a first camera having a first field of view;

a second camera having a second field of view;

a navigation antenna configured to receive navigation signals from satellites;

memory, wherein the memory comprises instructions for:

determining a position of the navigation device based on navigation signals received from satellites;

determining an orientation of the device based on data from an orientation sensor of the device;

obtaining a position of a point of interest;

obtaining a first live image from the first camera of the device;

displaying the first live image on a display of the device;

displaying a first marker in the first live image indicating a first location of the point of interest in the first live image, wherein the first location is based on the position of the device and the orientation of the device;

determining whether the point of interest is within the second field of view of the second camera of the device based on the position of the point of interest;

obtaining a second live image from the second camera of the device; and in response to the position of the point of interest being within the second field of view, displaying the second live image on the display of the device and a second marker in the second live image indicating a second location of the point of interest in the second live image, wherein the second location is based on the position of the device, the orientation of the device, and the position of the point of interest; and a processor configured to execute the instructions.

18. The device of claim 17, wherein the second field of view is substantially perpendicular to the first field of view of the first camera.

19. The device of claim 17, wherein displaying the second live image occurs in response to a user command.

20. The device of claim 17, wherein the first marker includes a fixed portion and a variable portion, wherein the fixed portion has a fixed size independent of a distance from the device to the point of interest, and wherein the variable portion has a size based on the distance from the GNSS device to the point of interest.

21. The device of claim 17, wherein the first marker is a color that depends on an error associated with the position of the device.

22. The device of claim 21, wherein the second marker is a color that depends on an error associated with the position of the device.

23. The device of claim 17, wherein the first marker includes an indication of the difference in elevation between the device and the point of interest.

24. The device of claim 17, wherein the position of the point of interest is obtained from memory in the device.

\* \* \* \* \*